US009571266B1

United States Patent
Aweya et al.

(10) Patent No.: US 9,571,266 B1
(45) Date of Patent: Feb. 14, 2017

(54) METHODS AND SYSTEMS FOR ESTIMATING SKEW

(71) Applicants: Khalifa University of Science, Technology and Research, Abu Dhabi (AE); British Telecommunications Plc, London (GB); Emirates Telecommunications Corporation, Abu Dhabi (AE)

(72) Inventors: James Aweya, Abu Dhabi (AE); Ivan Boyd, Ipswich (GB)

(73) Assignees: British Telecommunications PLC, London (GB); Khalifa University of Science Technology, and Research, Abu Dhabi (AE); Emirates Telecommunications Corporation, Abu Dhabi (AE)

( * ) Notice: Subject to any disclaimer, the term of this patent is extended or adjusted under 35 U.S.C. 154(b) by 0 days.

(21) Appl. No.: 15/053,393

(22) Filed: Feb. 25, 2016

(51) Int. Cl.
  *H03L 7/107* (2006.01)
  *H04L 7/033* (2006.01)
(52) U.S. Cl.
  CPC ........... *H04L 7/0331* (2013.01); *H04L 7/0332* (2013.01)
(58) Field of Classification Search
  CPC ............................ H04L 7/0331; H04L 7/0332
  See application file for complete search history.

(56) References Cited

U.S. PATENT DOCUMENTS

2009/0041104 A1\* 2/2009 Bogdan .............. H03K 5/15013
  375/226
2010/0158051 A1 6/2010 Hadzic et al.
2011/0234272 A1\* 9/2011 Yu ........................... H03L 7/089
  327/157
2014/0192797 A1 7/2014 Licardie et al.
2014/0292388 A1\* 10/2014 Mohajeri .............. H03L 7/1075
  327/157
2015/0092794 A1\* 4/2015 Aweya .................. H04J 3/0667
  370/503
2015/0092797 A1\* 4/2015 Aweya ..................... H03L 7/00
  370/516

OTHER PUBLICATIONS

Performance Analysis of Kalman-Filter-Based Clock, Synchronization in IEEE 1588 Networks, Giada Giorgi et al., IEEE Transactions on Instrumentation and Measurement, IEEE Service Center, Piscataway, NJ, US., vol. 60, No. 8, Aug. 1, 2011, pp. 2902-2909.
International Search Report and Written Opinion, from PCT/EP2016/054027, dated May 27, 2016.

\* cited by examiner

*Primary Examiner* — Dac Ha
(74) *Attorney, Agent, or Firm* — Calfee, Halter & Griswold, LLP

(57) ABSTRACT

This invention relates to methods and systems for estimating skew based on, for example, the IEEE 1588 Precision Time Protocol (PTP). These methods and systems can allow the clock skew between a master clock (server) and slave clock (client) exchanging PTP messages over a packet network to be estimated. In one embodiment, the slave employs a digital phase-locked loop (DPLL) driven by timestamps supplied from a master clock. The slave is able to process the timestamp information embedded in PTP Sync and Follow_Up messages in order to lock its frequency to that of the master clock. In certain embodiments a frequency locked DPLL and a local free-running counter are used to estimate the skew of the local slave oscillator.

12 Claims, 5 Drawing Sheets

Clock with no Offset

Clock with Offset

METHODS AND SYSTEMS FOR ESTIMATING SKEW

FIELD OF THE INVENTION

The present invention relates to methods and systems for estimating the skew. It is particularly, but not exclusively, concerned with methods and systems which estimate the skew of a clock in one device in relation to a clock in a second device connected over a network.

BACKGROUND OF THE INVENTION

Communication path delay measurements play an important role in the analysis, design and monitoring of networks. However, the clock skews (or frequency differences) between the clocks at the end points of the path can render the delay measurements inaccurate. To obtain more accurate delay measurements, the clock skews have to be accurately estimated and removed from (or compensated for) in the measurements.

End-to-end communication path delay traces are often used to analyze network performance. The measured path delays can be used to improve the design of networks, optimize the placement and use of network resources, monitor network loading and availability, optimize traffic routing and control mechanisms, detect network faults and traffic flow anomalies, etc. Delay traces are typically obtained by monitoring packet delays or by active probing. In either case, the difference between the arrival time of a packet (measured according to the destination clock), and its corresponding departure time from the source (indicated by a timestamp added by the source and conveyed by the packet), is considered to be the delay experienced by that packet.

If the source and destination clocks are perfectly synchronized, then the measured delay is the true delay between the two end points. However, in real systems, two clocks are rarely perfectly synchronized. The clocks can run at different speeds (i.e., have different frequencies). This difference in speed or frequency is called the clock skew. Given that the clocks at the end systems are not perfectly synchronized and run at different speeds, the delay measurements can be quite inaccurate. To obtain more accurate delay measurements, the clock skews have to be accurately estimated and removed from (or compensated for) in the measurements [1][2][3][4][5][6]. Network protocols such as the Network Time Protocol (NTP) and IEEE 1588 Precision Time Protocol (PTP) can be used for clock synchronization as well as perform network delay measurements.

OVERVIEW OF IEEE 1588V2 PTP

The IEEE 1588v2 PTP defines a packet-based synchronization protocol for communicating frequency, phase and time-of-day information from a master to one or more slaves with sub-microsecond accuracy. PTP relies on the use of accurately timestamped packets (at nanosecond level granularity) sent from a master clock to one or more slave clocks to allow them to (frequency, phase or time) synchronize to the master clock. Synchronization information is distributed hierarchically, with a GrandMaster clock at the root of the hierarchy.

The GrandMaster provides the time reference for one or more slave devices. These slave devices can, in turn, act as master devices for further hierarchical layers of slave devices. PTP provides a mechanism (i.e., Best Master Clock Algorithm) for slave clocks to select the best master clock in their respective synchronization domain. The selection is performed according to the PTP attributes of the GrandMaster (e.g. PTP priority, clock class).

The PTP message exchange process (i.e., the PTP Delay Request/Delay Response flow) between a master and a slave is illustrated in FIG. 1. IEEE 1588 PTP allows for two different types of timestamping methods, either one-step or two-step. One-step clocks update time information within event messages (Sync and Delay-Req) on-the-fly, while two-step clocks convey the precise timestamps of packets in general messages (Follow_Up and Delay-Resp). A Sync message is transmitted by a master to its slaves and either contains the exact time of its transmission or is followed by a Follow_Up message containing this time. In a two-step ordinary or boundary clock, the Follow_Up message communicates the value of the departure timestamp for a particular Sync message.

FIG. 1 illustrates the basic pattern of synchronization message exchanges for the two-step clocks. The master 1 sends a Sync message to the slave 3 over the intervening packet network 2 and notes the time $T_1$ at which it was sent. The slave 3 receives the Sync message and notes the time of reception $T_2$. The master 1 conveys to the slave 3 the timestamp $T_1$ by one of two ways: 1) Embedding the timestamp $T_1$ in the Sync message. This requires some sort of hardware processing (i.e., hardware timestamping) for highest accuracy and precision (this is the one-step method) or 2) embedding the timestamp $T_1$ in a Follow_Up message (as in the two-step method illustrated in FIG. 1). Next, the slave 3 sends a Delay_Req message to the master 1 and notes the time $T_3$ at which it was sent according to the local clock 5 in the slave. The master 1 receives the Delay_Req message and notes the time of reception $T_4$ according to the master clock 4. The master 1 conveys the timestamp $T_4$ to the slave 3 by embedding it in a Delay_Resp message.

At the end of this exchange of PTP messages, the slave possesses all four timestamps $\{T_1, T_2, T_3, T_4\}$. These timestamps may be used to compute the clock skew and offset of the slave's clock with respect to the master and the communication delay of messages between the two clocks. The computation of offset often assumes that the master-to-slave and slave-to-master path delays are equal, i.e. a symmetrical communication path. Clock frequencies change overtime, so periodic message exchanges are required. Because these clock variations change slowly, the period between message exchanges is typically on the order of milliseconds to seconds.

A clock with a non-zero skew will either run faster or slower than one with a zero skew. Using such a non-zero skew clock will certainly overestimate or underestimate the delay measurement of packet arrival, an important measure critical for optimal network operation. A number of existing techniques has been proposed to estimate the clock skew to remove its negative influence in the measured delay. Some components of these solutions such as the use of convex hull, linear programming, and definitions of objective functions are useful for estimating both skew and offset of clock.

Zhang et al. [4] use a convex hull algorithm to sort out relevant delay data and use three objective functions to determine which section of the convex hull that contains the optimal solution. In two dimensions, such algorithm can be viewed as creating an upper and a lower boundary of a convex polygon. For skew estimation, only the lower boundary is relevant. Thus, the convex hull algorithm processes the original collection of delay measurement into piecewise linear skew line segments while filtering out most of the delay measurement data.

The paper considers three different clock adjustment scenarios consisting of no clock reset, clock velocity adjustment, and instantaneous clock reset, the latter two of which can be considered as some form of clock reset. When there is no clock reset, there is only one convex hull to deal with. Otherwise the clock resets partition the delay data set into subsets, from each of which a distinct convex hull is formed.

For no clock reset, the clock skew is assumed to be constant. The paper also assumes that, for the instantaneous clock reset scenario, the clock skew is the same among all subsets of delay data, whilst, for clock velocity adjustment scenario, the clock skew changes over time. The points of clock resets are either given or assumed to be obtainable through analyzing the delay data set.

When there is no clock reset, the location where the optimal clock skew is, is easily obtained based on the conditions determined by some objective functions which are set out in the paper. Assuming the point of clocks resets are given, the paper identifies the section of the convex hull for the instantaneous clock reset scenario. Corresponding details for the clock velocity adjustment scenario according to the different objective functions are not provided.

In summary, the proposed solutions in Zhang et al are intended to estimate and remove the relative clock skew from delay measurements. The authors consider various clock reset scenarios with different assumptions of the skew characteristics. Three objective functions are proposed and underlying all these solutions is the use of convex hull to sort out relevant delay data on which candidate skew values are estimated.

Even if the clock resets can be found as proposed in this paper, usually they could be determined only after sufficient amount of data is collected (meaning the technique can only be used offline and not online as data is received). The presence of clock resets complicates clock estimation solutions. Therefore some form of data windowing may be needed.

Bletsas [6] presents the evaluation of three algorithms for estimating local clock parameters when the Internet is used to connect to a single time reference server. Kalman filtering is chosen for its optimality for the Gaussian data case and appealing recursive nature; the linear programming technique for its intuitive structure; and the averaging technique (referred as averaged time differences (ATD)) for its simplicity and wide spread deployment.

The performance of the algorithms depends on the delay behaviour of the NTP messages. If it is Gaussian, Kalman filtering technique is optimal. This technique also performs well with self-similar delay data when more delay data are available.

The linear prediction (LP) technique performs best compared to the other two techniques for the case of bursty traffic but not as well for completely independent traffic. This technique is a line-fitting technique that exploits both the forward and reverse path timestamps, by estimating a clock line that minimizes the distance between the line and the data The averaged time differences (ATD), though inferior to LP and Kalman filtering techniques at the self-similar case, is simple and produces reasonable results for small number of measurements and when cost and accuracy trade-off cannot be avoided.

In summary, all algorithms in this document improve with increasing number of samples.

Moon et al. [2] disclose a linear programming technique to estimate skew with the objective of removing the skew inadvertent contribution from the delay measurement.

The goal of the skew estimation algorithm described here is to remove skew from measured network delays so as to make it consistent with the reference clock. As such, the model is tightly integrated to remove skew contribution in the measured delay.

An object of the present invention is to provide a simple method and system for estimating the skew of a local slave oscillator.

SUMMARY OF THE INVENTION

An exemplary embodiment of the invention provides a method of estimating the skew of a first clock in a slave device relative to a second clock in a master device, the slave device and master device being communicatively connected by a network, the method including the steps of: receiving, at the slave device, timing messages sent from the master device having timestamps from the second clock; deriving in the slave device, using said timing messages, a corrected clock which is an adjusted version of the first clock and which is synchronized to the second clock; calculating the ratio between the evolution of the corrected clock and the evolution of the uncorrected clock over a discrete time period; and estimating the skew from the calculated ratio.

A further exemplary embodiment of the invention provides a slave device connected to a master device over a network, the slave device having a first clock and a processor, the processor being arranged to: receive timing messages sent from the master device, the messages having timestamps from a second clock in the master device; derive, using said timing messages, a corrected clock which is an adjusted version of the first clock and which is synchronized to the second clock; calculate the ratio between the evolution of the corrected clock and the evolution of the uncorrected clock over a discrete time period; and estimate the skew from the calculated ratio.

A further exemplary embodiment of the invention provides a networked system, the system including a master device and a slave device connected over a network, wherein: the slave device has a first clock and a processor; the master device has a second clock; and the processor is arranged to: receive timing messages sent from the master device, the messages having timestamps from a second clock in the master device; derive, using said timing messages, a corrected clock which is an adjusted version of the first clock and which is synchronized to the second clock; calculate the ratio between the evolution of the corrected clock and the evolution of the uncorrected clock over a discrete time period; and estimate the skew from the calculated ratio.

BRIEF DESCRIPTION OF THE DRAWINGS

Embodiments of the invention will now be described by way of example with reference to the accompanying drawings in which.

DETAILED DESCRIPTION

Figure 1:
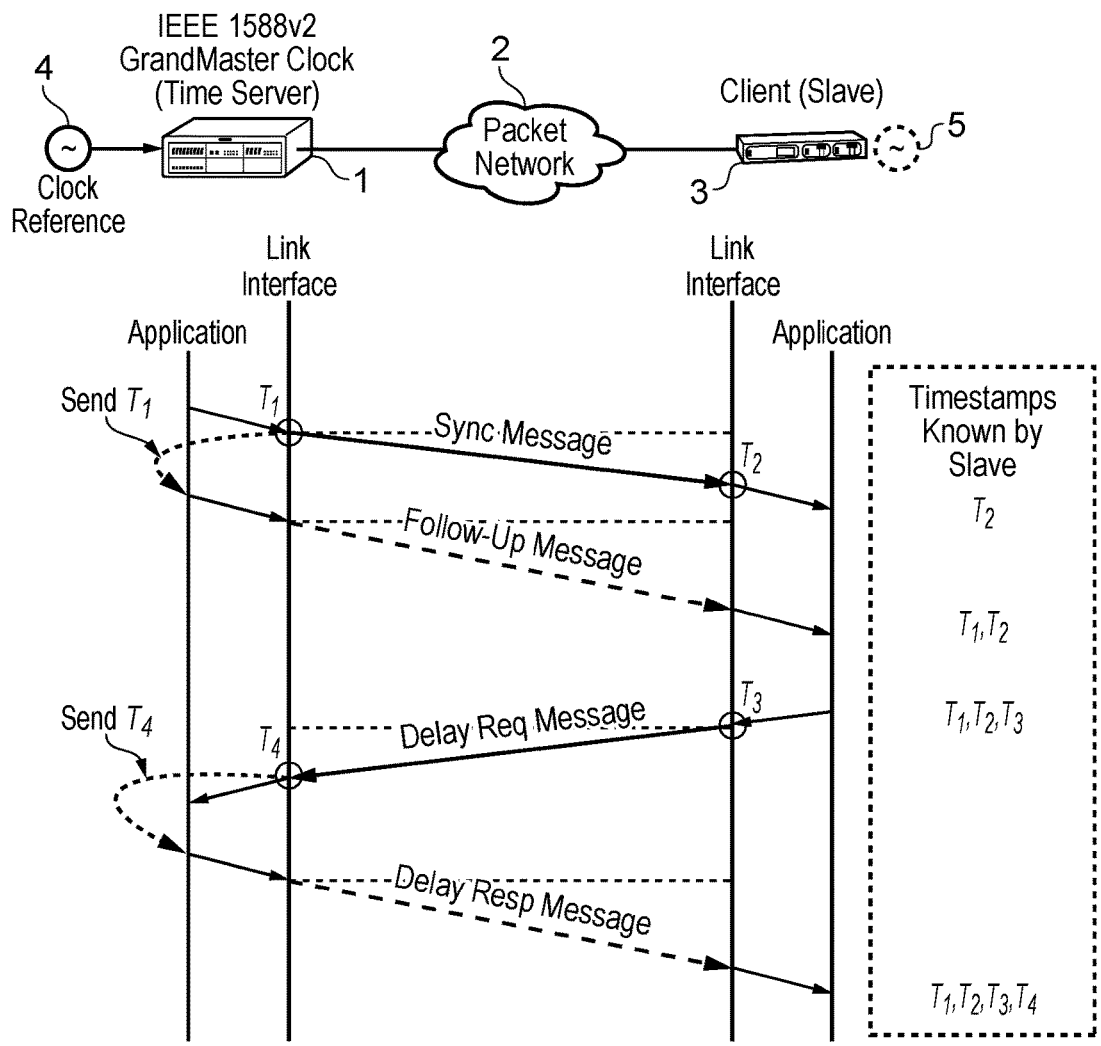
FIG. 1 shows, in schematic form, the exchange of timing messages according to the two-step clock synchronization process in accordance with the PTP and has already been described.

At their broadest, aspects of the present invention provide for methods, devices and systems which estimate the skew of a slave clock compared to a master clock using a calculated ratio between the evolution of a clock synchronized to the master clock and an uncorrected clock.

A first aspect of the present invention provides a method of estimating the skew of a first clock in a slave device relative to a second clock in a master device, the slave device and master device being communicatively connected by a network, the method including the steps of: receiving, at the slave device, timing messages sent from the master device having timestamps from the second clock; deriving in the slave device, using said timing messages, a corrected clock which is an adjusted version of the first clock and which is synchronized to the second clock; calculating the ratio between the evolution of the corrected clock and the evolution of the uncorrected clock over a discrete time period; and estimating the skew from the calculated ratio.

By accurately estimating the skew, more accurate delay measurements in the slave device can be obtained as the skew of the clock in the slave device can be removed from, or compensated for, in the measurements and calculations.

Preferably the network is a packet network. Preferably the timing messages are sent according to IEEE 1588 Precision Time Protocol (PTP).

The slave is able to process the timestamp information embedded in PTP Sync and Follow_Up messages in order to lock its frequency to that of the master clock.

The frequency synchronization and clock skew estimation in the method of this aspect can be done using only one-way measurements, for example, via IEEE 1588 PTP Sync and Follow_Up messages, from the master to the slave. Thus two-way timing message exchanges are not required.

In embodiments of the invention, the skew is estimated as $$\alpha = \frac{\Delta R_n}{\Delta C_n} - 1$$

wherein $\alpha$ is the skew, $\Delta R_n$ is the evolution of the corrected clock between the times n−1 and n, and $\Delta C_n$ is the evolution of the first clock between the times n−1 and n.

Preferably the corrected clock is derived using a digital phase-locked loop. More preferably the digital phase-locked loop operates by: initializing a counter on arrival of the first of said timing messages in the slave device; and repeatedly: incrementing the counter with the output of a phase accumulator driven by an oscillator in the slave device; comparing the phase of the timestamps in the timing messages arriving at the slave device with the value of the counter to calculate an error signal; filtering the error signal to produce a control signal; and controlling the frequency of the phase accumulator using said control signal to synchronise the frequency of the output of the phase accumulator with the frequency of the second clock.

The first clock may be a free-running counter driven by an oscillator in the slave device. Where the corrected clock is derived using a digital phase-locked loop as described above, the oscillator driving the phase accumulator is preferably the same oscillator as that driving the free-running counter.

The method of the present aspect may include any combination of some, all or none of the above described preferred and optional features.

The method of the above aspect is preferably implemented by a slave device according to the second aspect of this invention, as described below, or a system according to the third aspect of this invention, as described below, but need not be.

Further aspects of the present invention include computer programs for running on computer systems which carry out the method of the above aspect, including some, all or none of the preferred and optional features of that aspect.

A second aspect of the present invention provides a slave device connected to a master device over a network, the slave device having a first clock and a processor, the processor being arranged to: receive timing messages sent from the master device, the messages having timestamps from a second clock in the master device; derive, using said timing messages, a corrected clock which is an adjusted version of the first clock and which is synchronized to the second clock; calculate the ratio between the evolution of the corrected clock and the evolution of the uncorrected clock over a discrete time period; and estimate the skew from the calculated ratio.

By accurately estimating the skew, more accurate delay measurements in the slave device can be obtained as the skew of the clock in the slave device can be removed from, or compensated for, in the measurements and calculations.

Preferably the network is a packet network. Preferably the timing messages are sent according to IEEE 1588 Precision Time Protocol (PTP).

The slave is able to process the timestamp information embedded in PTP Sync and Follow_Up messages in order to lock its frequency to that of the master clock.

The frequency synchronization and clock skew estimation in the method of this aspect can be done using only one-way measurements, for example, via IEEE 1588 PTP Sync and Follow_Up messages, from the master to the slave. Thus two-way timing message exchanges are not required.

In embodiments of the invention, the processor estimates the skew as $$\alpha = \frac{\Delta R_n}{\Delta C_n} - 1$$

wherein $\Delta$ is the skew, $\Delta R_n$ is the evolution of the corrected clock between the times n−1 and n, and $\Delta C_n$ is the evolution of the first clock between the times n−1 and n.

Preferably the device further includes a digital phase-locked loop which is arranged to derive said corrected clock, and an oscillator. More preferably, the digital phase-locked loop has: a counter which is initialized on arrival of the first of said timing messages in the slave device; a phase accumulator driven by the oscillator, the output of which increments the counter; a phase detector which compares the phase of the timestamps in the timing messages arriving at the slave device with the value of the counter to calculate an error signal; a loop filter which filters the error signal to produce a control signal which controls the frequency of the phase accumulator to synchronise the frequency of the output of the phase accumulator with the frequency of the second clock.

The first clock may be a free-running counter driven by an oscillator in the slave device. Where the corrected clock is derived using a digital phase-locked loop as described above, the oscillator driving the phase accumulator is preferably the same oscillator as that driving the free-running counter.

The device of the present aspect may operate by using a method according to the above described first aspect, including some, all, or none of the optional and preferred features of that aspect, but need not do so.

The device of the present aspect may include any combination of some, all or none of the above described preferred and optional features.

A third aspect of the present invention provides a networked system, the system including a master device and a slave device connected over a network, wherein: the slave device has a first clock and a processor; the master device has a second clock; and the processor is arranged to: receive timing messages sent from the master device, the messages having timestamps from a second clock in the master device; derive, using said timing messages, a corrected clock which is an adjusted version of the first clock and which is synchronized to the second clock; calculate the ratio between the evolution of the corrected clock and the evolution of the uncorrected clock over a discrete time period; and estimate the skew from the calculated ratio.

By accurately estimating the skew, more accurate delay measurements in the slave device can be obtained as the skew of the clock in the slave device can be removed from, or compensated for, in the measurements and calculations.

Preferably the network is a packet network. Preferably the timing messages are sent according to IEEE 1588 Precision Time Protocol (PTP).

The slave is able to process the timestamp information embedded in PTP Sync and Follow_Up messages in order to lock its frequency to that of the master clock.

The frequency synchronization and clock skew estimation in the method of this aspect can be done using only one-way measurements, for example, via IEEE 1588 PTP Sync and Follow_Up messages, from the master to the slave. Thus two-way timing message exchanges are not required.

In embodiments of the invention, the processor estimates the skew as $$\alpha = \frac{\Delta R_n}{\Delta C_n} - 1$$

wherein $\alpha$ is the skew, $\Delta R_n$ is the evolution of the corrected clock between the times n−1 and n, and $\Delta C_n$ is the evolution of the first clock between the times n−1 and n.

Preferably the slave device further includes a digital phase-locked loop which is arranged to derive said corrected clock, and an oscillator. More preferably, the digital phase-locked loop has: a counter which is initialized on arrival of the first of said timing messages in the slave device; a phase accumulator driven by the oscillator, the output of which increments the counter; a phase detector which compares the phase of the timestamps in the timing messages arriving at the slave device with the value of the counter to calculate an error signal; a loop filter which filters the error signal to produce a control signal which controls the frequency of the phase accumulator to synchronise the frequency of the output of the phase accumulator with the frequency of the second clock.

The first clock may be a free-running counter driven by an oscillator in the slave device. Where the corrected clock is derived using a digital phase-locked loop as described above, the oscillator driving the phase accumulator is preferably the same oscillator as that driving the free-running counter.

The system of the present aspect may operate by using a method according to the above described first aspect, including some, all, or none of the optional and preferred features of that aspect, but need not do so.

The system of the present aspect may include any combination of some, all or none of the above described preferred and optional features.

Frequency Synchronization Using a DPLL

Figure 2:
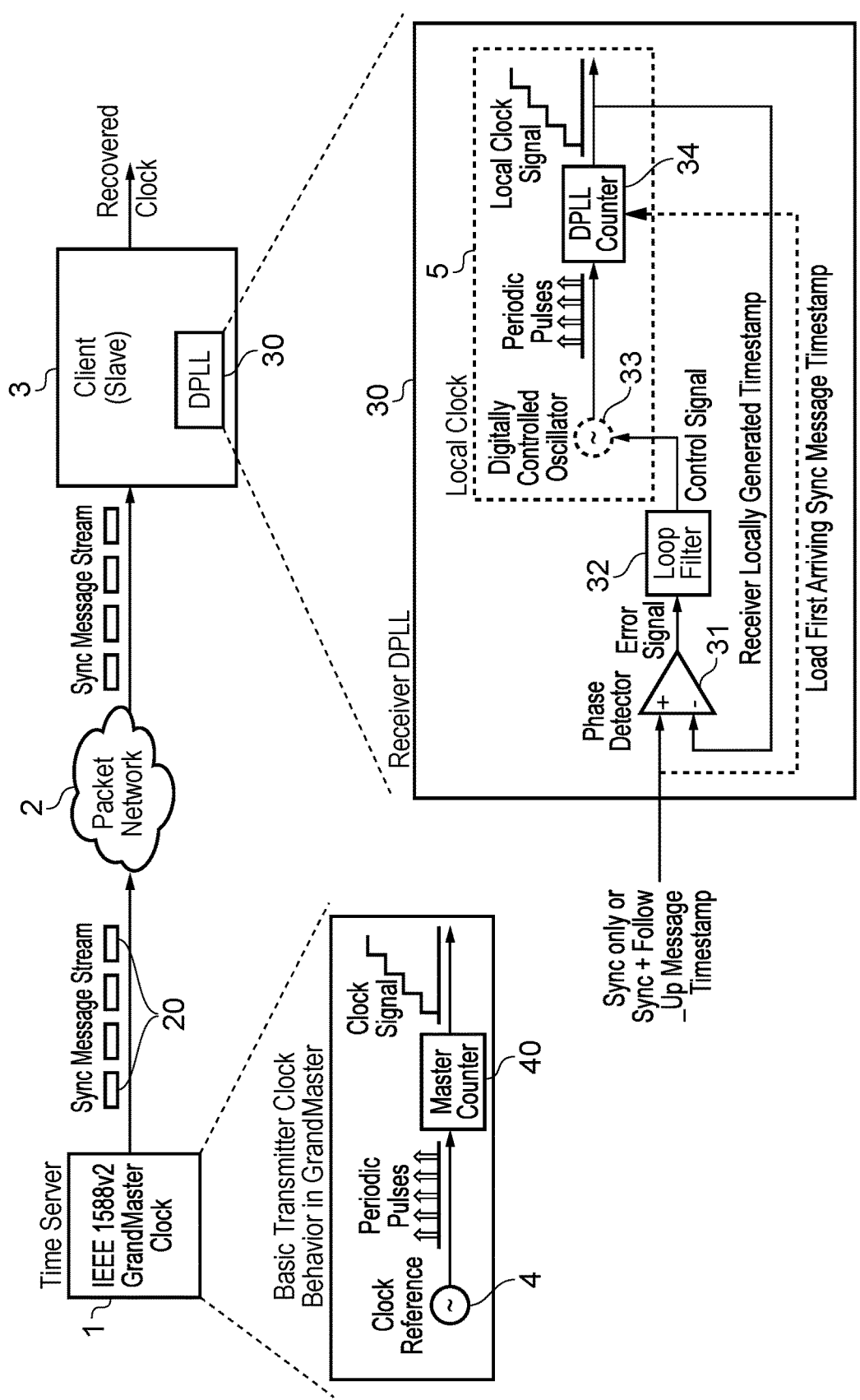
FIG. 2 shows the basic architecture of a time server and client according to an embodiment of the present invention.

The transmitter (master or PTP GrandMaster) clock 1 can be viewed conceptually as consisting simply of a high accuracy, high performance oscillator 4 and a (master) counter 40 (see FIG. 2). The oscillator 4 produces periodic pulses that constitute the input to the master counter 40. The oscillator frequency is the inverse of the interval between consecutive pulses (oscillator period). The output of the master counter 40 represents the master clock signal and is incremented by a fixed amount at each pulse (e.g., 8 ns increments for a 125 MHz nominal oscillator frequency). Samples of master clock signals are communicated to the receiver 3 (slave) as timestamps in Sync messages 20. The local clock 4 in the master 1 is free running or possibly synchronized to an external source of time such as the Global Positioning System (GPS) or an atomic clock.

From the flow of timestamp messages 20 arriving at the receiver 3, the receiver DPLL 30 tunes its internal controlled oscillator 33 such that it produces an output clock signal that is identical to the transmitter clock. To do this, the first arriving timestamp at the receiver 3 is used to initialize the master counter 34 and DPLL control is exercised such that the master counter readings coincide with arriving timestamp values. The timestamps used in determining the arrival instants of timestamp messages are based on timestamps generated from the local clock 5. The control loop in the receiver DPLL 30 adjusts the clock 5 to agree with the time of its master 1, that is, to make the rate of the local clock 5 equal to that of the master 1.

In a frequency synchronization technique according to an embodiment of the present invention, each broadcast begins at time $T_1$ with a Sync message sent by the master 1 to all the slave clocks 5 in the domain. A slave clock 5 receiving this message takes note of the local time $T_2$ when this message is received. The master 1 may subsequently send a multicast Follow_Up with accurate $T_1$ timestamp, the reason being not all masters have ability to present an accurate time stamp in the Sync message. It is only after the transmission is complete that they are able to retrieve an accurate time stamp for the Sync transmission from their network hardware. Masters with this limitation use the Follow_Up message to convey $T_1$ (two-step clock). Masters with PTP capabilities built into their network hardware are able to present an accurate time stamp in the Sync message and do not need to send Follow_Up messages, these are called one-step clocks.

Figure 3:
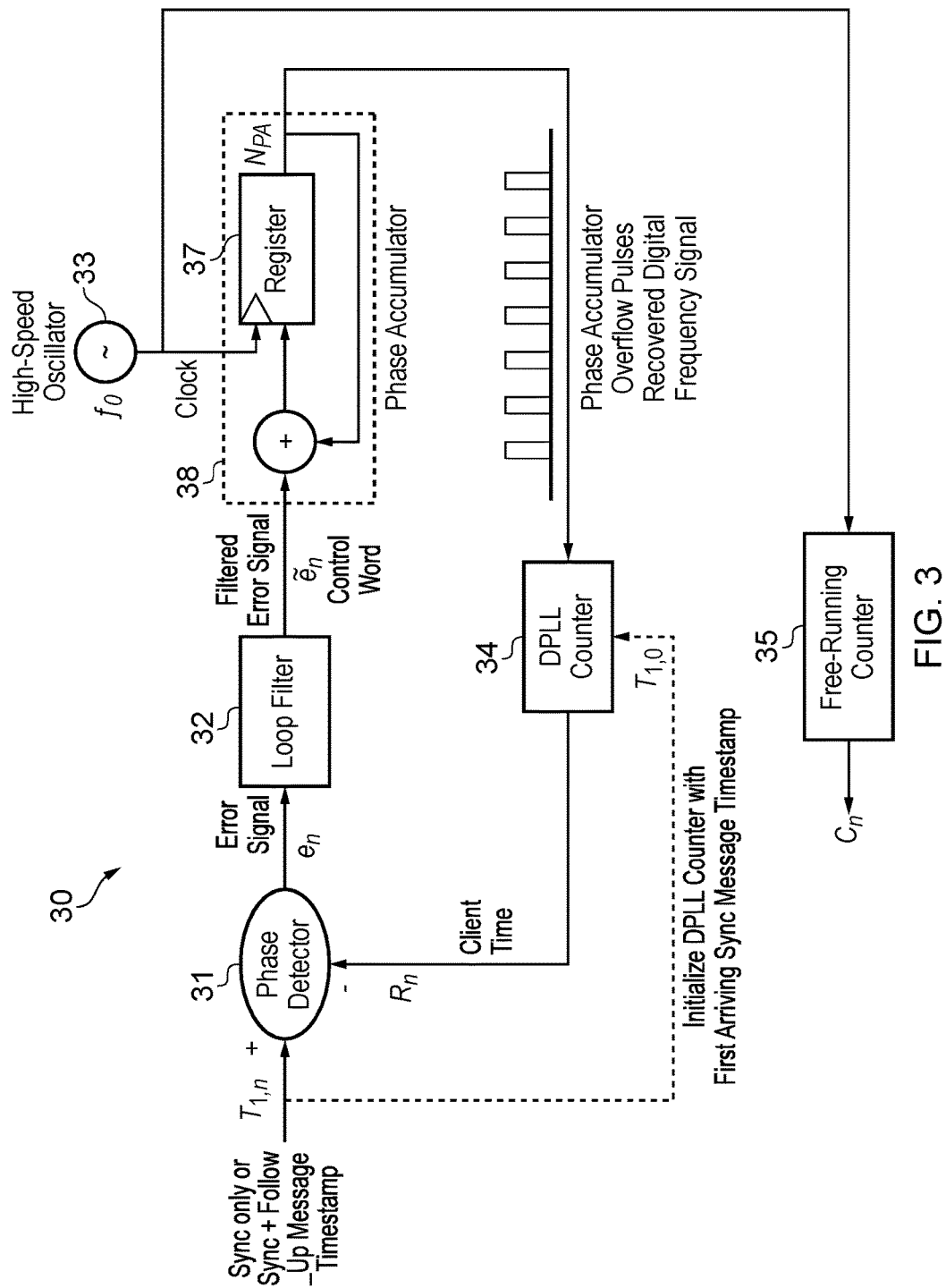
FIG. 3 shows more detail of the digital phase-locked loop of a time client according to an embodiment of the present invention.

The controlled oscillator 33 within the DPLL 30 produces a periodic pulse signal which drives a local DPLL counter 34 whose output enters the phase detector 31, as shown in FIGS. 2 and 3. Here the phase of the signals from the DPLL counter 34 and the incoming reference signal in the form of timestamps are compared and a resulting difference or error signal is produced. This error corresponds to the phase difference between the two signals, transmitter and receiver clocks.

The error signal from the phase detector 31 in the DPLL 30 passes through a low pass filter 32 (loop filter) which governs many of the properties of the loop and removes any high frequency elements on the signal. Once through the filter 32 the error signal is applied to the control terminal of the controlled oscillator 33 as its control or tuning signal. The nature of this control signal is such that it tries to reduce the phase difference and hence the frequency between the two signals. Initially the loop will be out of lock, and the filtered error signal will pull the frequency of the controlled oscillator 33 towards that of the reference, until it cannot reduce the error any further and the loop is locked.

This frequency synchronization strategy allows multiple slaves, for example in a broadcast or point-to-multipoint communication scenario, to synchronize their clocks to the master. The one-step clock and two-step clock algorithms used by the slave DPLL 30 to synchronize its frequency to that of the master are described in WO 2013/020903A and are hereby incorporated by reference.

Let $S_n = T_{1,n}$ denote the timeline (e.g., in clock increments of say 8 ns for a 125 MHz clock) of the transmitter and $R_n = T_{2,n}$ the timeline of the receiver. These two functions correspond to the timestamps of the two clocks at discrete time instants n, n=0,1,2, . . . . We assume that the timelines $S_n = T_{1,n}$ and $R_n = T_{2,n}$ are discrete time samples of the master (server) clock S(t) and the tunable (synchronized) slave clock R(t), respectively. The state of the free-running counter 35 is denoted in discrete time and continuous time, respectively, by $C_n$ and C(t).

In the DPLL 30, only when the phase between the two signals (that is the difference between transmitter timestamp $S_n = T_{1,n}$ and receiver timestamp $R_n = T_{2,n}$) is changing is there a frequency difference. The phase difference decreases towards zero when the loop is in lock, which means that the frequency of the DPLL internal controlled oscillator is exactly the same as the reference frequency.

The DPLL 30 employs a phase accumulator 38, a loop filter 32, a phase detector 31, and a counter 34 as shown in FIG. 3. In the method according to this embodiment, at each phase accumulator overflow (output) pulse, the DPLL counter 34 is incremented by the nominal period of the phase accumulator overflow pulse (e.g., 8 ns for a 125 MHz nominal phase accumulator overflow output frequency). The DPLL 30 is controlled in such a way that the DPLL counter evolution follows the server counter as illustrated in FIG. 2.

Figure 4:
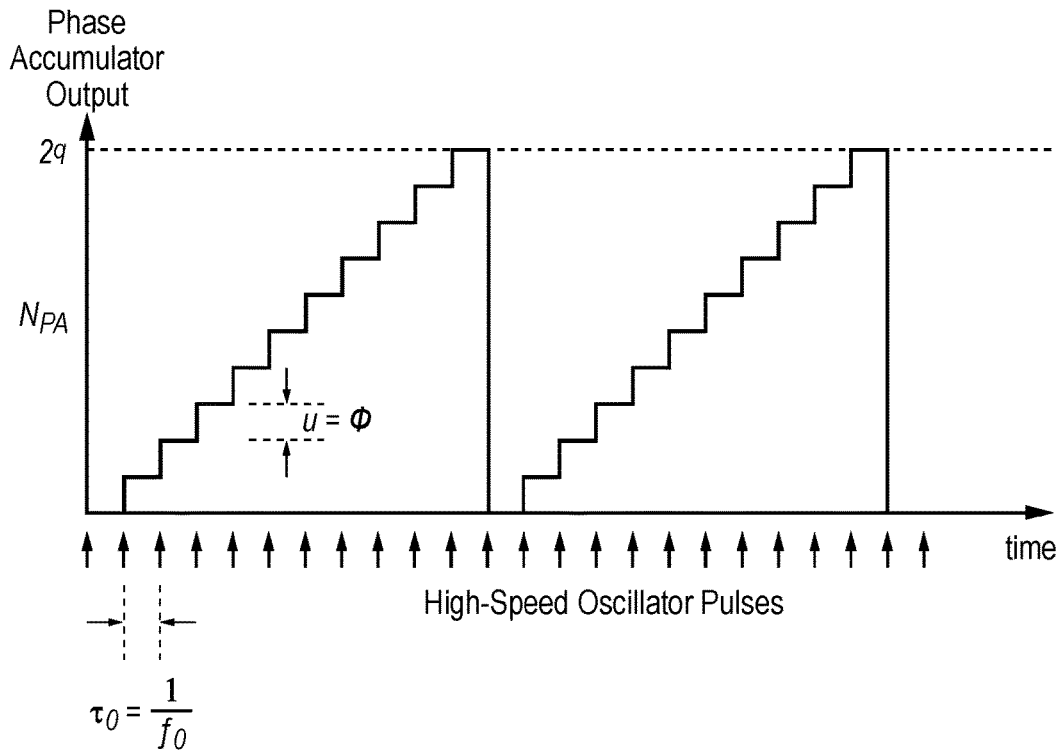
FIG. 4 shows the phase accumulator output in a digital phase-locked loop of a time client according to an embodiment of the present invention.

The phase accumulator 38 is a variable-modulus counter that increments the number stored in it each time it receives a clock pulse. When the counter overflows it wraps around, making the phase accumulator's output contiguous as shown in FIG. 4. The larger the added increment $\Phi$, the faster the accumulator overflows, which results in a higher output frequency. The output frequency $f_{ACC}$ of the phase accumulator 38 is a function of the system clock frequency $f_o$, the number of bits q in the phase accumulator and the phase increment value $\Phi$. The phase increment $\Phi$ is an unsigned value.

$$f_{ACC} = \frac{f_o}{2^q} \phi \qquad (1)$$

From this equation it can be seen that the frequency resolution of the phase accumulator 38 is $f_{res} = f_o/2^q$. It is assumed that the phase accumulator is operating with a control input $\Phi_{nom}$ which corresponds to the nominal frequency $f_{ACC} = f_{nom}$. It can be seen from the above discussion that adding a quantity $-\Phi_{corr}$ to $\Phi_{nom}$ (i.e., $\Phi_{ACC} = \Phi_{nom} - \Phi_{corr}$) results in a decrease in the output frequency, $f_{ACC} = f_{nom} - \Delta f$, whereas adding a quantity $+\Phi_{corr}$ to $\phi_{nom}$ (i.e., $\Phi_{ACC} = \Phi_{nom} + \Phi_{corr}$) results in an increase in the output frequency, $f_{ACC} = f_{nom} + \Delta f$. Thus, by appropriately controlling the quantity $\Phi_{corr}$ added to $\Phi_{nom}$, the output frequency of the phase accumulator $f_{ACC}$ can be controlled accordingly.

For example, at startup in a system operating in the one-step clock mode, the DPLL 30 waits for the first arriving Sync message timestamp $(T_{1,0})$. This first server timestamp is used to initialize the DPLL counter 34 $(R_0 = T_{1,0})$. From this point onwards and upon the receipt of subsequent Sync message timestamps $(T_{1,n})$ at any discrete time instant n, the DPLL 30 starts to operate in a closed-loop fashion. At each Sync message timestamp arrival $(T_{1,n})$, the DPLL counter reading is noted by the slave $(R_n)$. Then the difference between the arriving server timestamp $(T_{1,n})$ and the DPLL counter reading $(R_n)$ gives an error signal $(e_n = T_{1,n} - R_n)$. This error signal $(e_n)$ is sent to the loop filter 32 whose output controls the frequency of the phase accumulator 38. The output (overflow pulses) of the phase accumulator 38 in turn provides the clock frequency of the slave and also drives the DPLL counter 34. After a while the error term is expected to converge to zero which means the DPLL has been locked to the incoming master timeline.

The control models for the phase detector 31, and digitally controlled oscillator, and given some general structure of the loop filter 32, the DPLL 30 as a whole are described in more detail in WO 2013/020903A and are hereby incorporated by reference. WO 2013/020903A also provides design procedures for determining the parameters of the loop filter 32 that will meet certain pre-specified design and performance requirements.

Clock Skew Estimation Using a DPLL

Figure 5A:
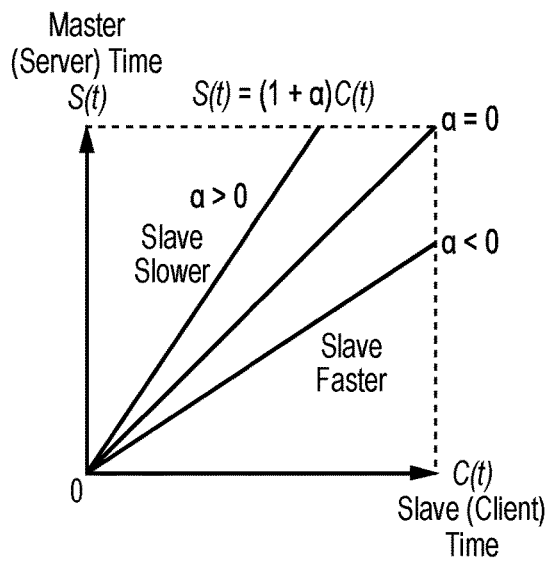
FIGS. 5a and 5b show the principles of a skew model with, respectively, no offset and with offset.
Figure 5B:
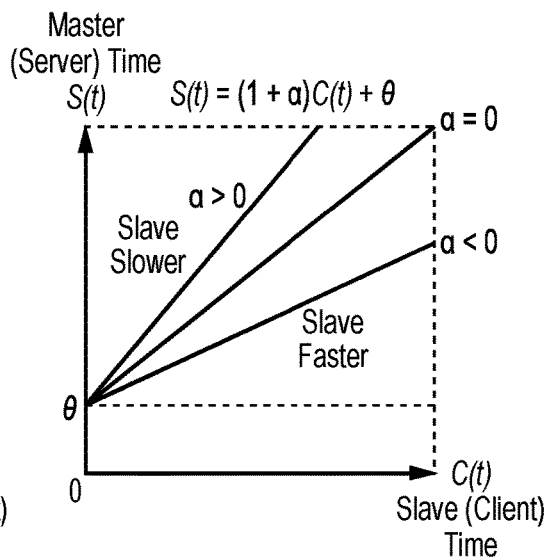

Next a technique, according to an embodiment of the present invention, for estimating the skew of the free-running local oscillator using the DPLL and free-running counter described above will be described. First a generalized clock offset and skew equation for the synchronization problem is defined. It is assumed that, at any particular time instant, the instantaneous view of the relationship between the master (server) clock with timeline S(t) and the slave free-running clock with timeline C(t), can be described by the well-known simple skew clock model depicted in FIG. 5, and described by the equation, $$S(t) = (1+\alpha)C(t) + \theta, \qquad (2)$$

where θ is the time offset and α is the skew (frequency offset) between master clock and free-running clock. The skew α is typically a very small quantity expressed in the order of parts-per-million. This snapshot is an instantaneous view of how well the two clocks are (mis)aligned. FIG. 5 illustrates the influence of θ and α on the alignment.

The clock skew (α) is estimated by the client 3 after each Sync message broadcast by the server 1 or after multiple periods of the Sync message broadcast. The period between Sync messages could serve as sampling period of the system. FIG. 3 shows the main blocks of the proposed synchronization and skew estimation mechanism at the time client 3. A free running local oscillator 33 and counter 35 are used together with the DPLL 30 to estimate the skew of the local free-running (high-speed) oscillator.

Skew Estimation

If the DPLL 30 locks onto the master 1 and achieves accurate frequency synchronization (a technique for accuracy analysis is described further below), then it can be assumed that $\Delta R_n = \Delta S_n$, meaning that the master timeline and the DPLL counter 34 evolve at the same rate. If $A_{cc}$ denotes the level of frequency synchronization accuracy in parts-per million (ppm) or parts-per billion (ppb), then $A_{cc}=0$ implies perfect (ideal) frequency synchronization and a positive $A_{cc}$ as the DPLL 30 (specifically the DPLL counter 34) running faster than the master by $A_{cc}$. The underlying idea is to make the slope of the slave DPLL timeline $R_n$ equal to that of the master timeline $S_n$.

Equation (2) above can be written in discrete time as $$S_n = (1+\alpha)C_n + \theta \qquad (3)$$

From this $$\Delta S_n = (1+\alpha)\Delta C_n, \qquad (4)$$

where $\Delta S_n = S_n - S_{n-1} = T_{1,n} - T_{1,n-1}$ and $\Delta C_n = C_n - C_{n-1}$. If accurate frequency synchronization is achieved, then the evolution of $R_n$ becomes a local (slave) copy of the evolution of the master clock $S_n$, that is, $\Delta R_n = \Delta S_n$. Under this condition, $$\Delta R_n = (1+\alpha)\Delta C_n \qquad (5)$$

With this, if incremental changes of both the DPLL counter $\Delta R_n$ and the free-running counter $\Delta C_n$ are taken at a given time instant, then a one-time estimate of the clock skew can be obtained as $$\alpha = \frac{\Delta R_n}{\Delta C_n} - 1 \qquad (6)$$

It is assumed that the two counters are sampled at the same time instant. The sample skew values obtained from the above can be filtered to obtain an estimate of the skew between master clock and slave clock. From (6), it can be inferred that $\Delta C_n = \Delta R_n \Rightarrow \alpha = 0$ $\Delta C_n > \Delta R_n \Rightarrow \alpha < 0$ (free-running counter is faster)

$\Delta C_n < \Delta R_n \Rightarrow \alpha > 0$ (free-running counter is slower) (7)

The relationships in (7) are already depicted in FIG. 5.

Accuracy Analysis

As discussed above, $A_{cc}$ denotes the level of frequency synchronization accuracy in ppm or ppb, that is, accuracy of evolution of $R_n$ with respect to $S_n$. $A_{free}$ is used to denote the accuracy of the evolution of the free-running clock $C_n$ with respect to the master $S_n$. For telecommunication applications, $A_{free}$ is typically in ppm, e.g., 4.6 ppm for a Stratum 3 clock and 32 ppm for a Stratum 4 clock. For mobile applications, for example, $A_{cc}$ at the air interface should be no more 50 ppb and 16 ppb at the incoming synchronization interface.

Using (6) and given an ideal reference interval $\Delta t$, a specified $A_{cc}$ and $A_{free}$, it follows that $$\alpha = \frac{(1 \pm A_{cc})\Delta t}{(1 \pm A_{free})\Delta t} - 1 = \frac{(1 \pm A_{cc})}{(1 \pm A_{free})} - 1 \qquad (8)$$

Taking for example, $A_{cc}=+16$ ppb (i.e., DPLL counter running faster by 16 ppb and counts in excess over $\Delta t$), and $A_{free}=+4$ ppm (free-running clock running faster by 4 ppm and counts in excess over $\Delta t$), gives $$\alpha = \frac{(1 + 16 \times 10^{-9})}{(1 + 4 \times 10^{-6})} - 1 =$$

$$\frac{(1 + 0.000000016)}{(1 + 0.000004)} - 1 \approx -3.98398 \times 10^{-6} \approx -4 \text{ ppm,}$$

as expected. Note that by the above definition of $\alpha$ and equation (2), $\alpha < 0$ implies the slave free-running counter $C_n$ (reference 35) is faster than the master clock $S_n$ (see FIG. 5). For $A_{cc}=+50$ ppb, $\alpha \approx -3.94998 \times 10^{-6}$, and for $A_{cc}=+100$ ppb, $\alpha \approx -3.89998 \times 10^{-6}$. For a perfect frequency lock, $A_{cc}=0$ ppb, which means $$\alpha = \frac{1}{(1 \pm A_{free})} - 1 = \frac{\mp A_{free}}{(1 \pm A_{free})} \qquad (9)$$

But, given that for Telecom applications $A_{free}$ is typically a very small quantity (in ppm), it can safely be assumed that $\alpha \approx \mp A_{free}$ under these conditions.

Real-Time Estimation and Monitoring of DPLL Frequency Synchronization Accuracy

Next a technique for estimating the frequency synchronization accuracy $A_{cc}$ in real-time according to an embodiment of the present invention will be described. This technique can also be used to monitor the tracking efficiency of the frequency synchronization scheme, i.e., the DPLL in real-time. First, it is assumed that some level of frequency synchronization accuracy $A_{cc}$ is achieved by the DPLL 30. Next the relationship between the synchronized clock (i.e., DPLL counter) R(t) and the master clock S(t) is modeled by $$S(t) = (1 + A_{cc})R(t) + \theta_{cc}, \qquad (10)$$

where $\theta_{cc}$ is a clock offset. In discrete time, this can be expressed as $$S_n = (1 + A_{cc})R_n + \theta_{cc} \qquad (11)$$

From this $$\Delta S_n = (1 + A_{cc})\Delta R_n, \qquad (12)$$

where $\Delta R_n = R_n - R_{n-1}$. If the $T_{1,n}$ timestamps are sent at fixed intervals $\Delta T$ (as is allowed in PTP), then $\Delta S_n = T_{1,n} - T_{1,n-1} = \Delta T$. Summing over N samples, gives $$N\Delta T = (1 + A_{cc}) \sum_{i=0}^{N-1} \Delta R_{n-i}, \qquad (13)$$

from which we get $$A_{cc} = \frac{N \Delta T}{\sum_{i=0}^{N-1} \Delta R_{n-i}} - 1 = \frac{\Delta T}{\overline{\Delta R_n}} - 1, \qquad (14)$$

where $$\overline{\Delta R_n} = \sum_{i=0}^{N-1} \Delta R_{n-i} / N$$

is the average of the $\Delta R_n$ samples. $\overline{\Delta R_n}$ can be estimated by several methods one of which is the well-known exponentially weighted moving average (EWMA) technique which can be expressed as $$\overline{\Delta R_n} = (1-\gamma)\overline{\Delta R_{n-1}} + \gamma \Delta R_n, \quad (15)$$

where $0<\gamma<1$ is a filtering parameter. This simple technique allows $A_{cc}$ to be estimated continuously and efficiently in real-time.

Figure 6:
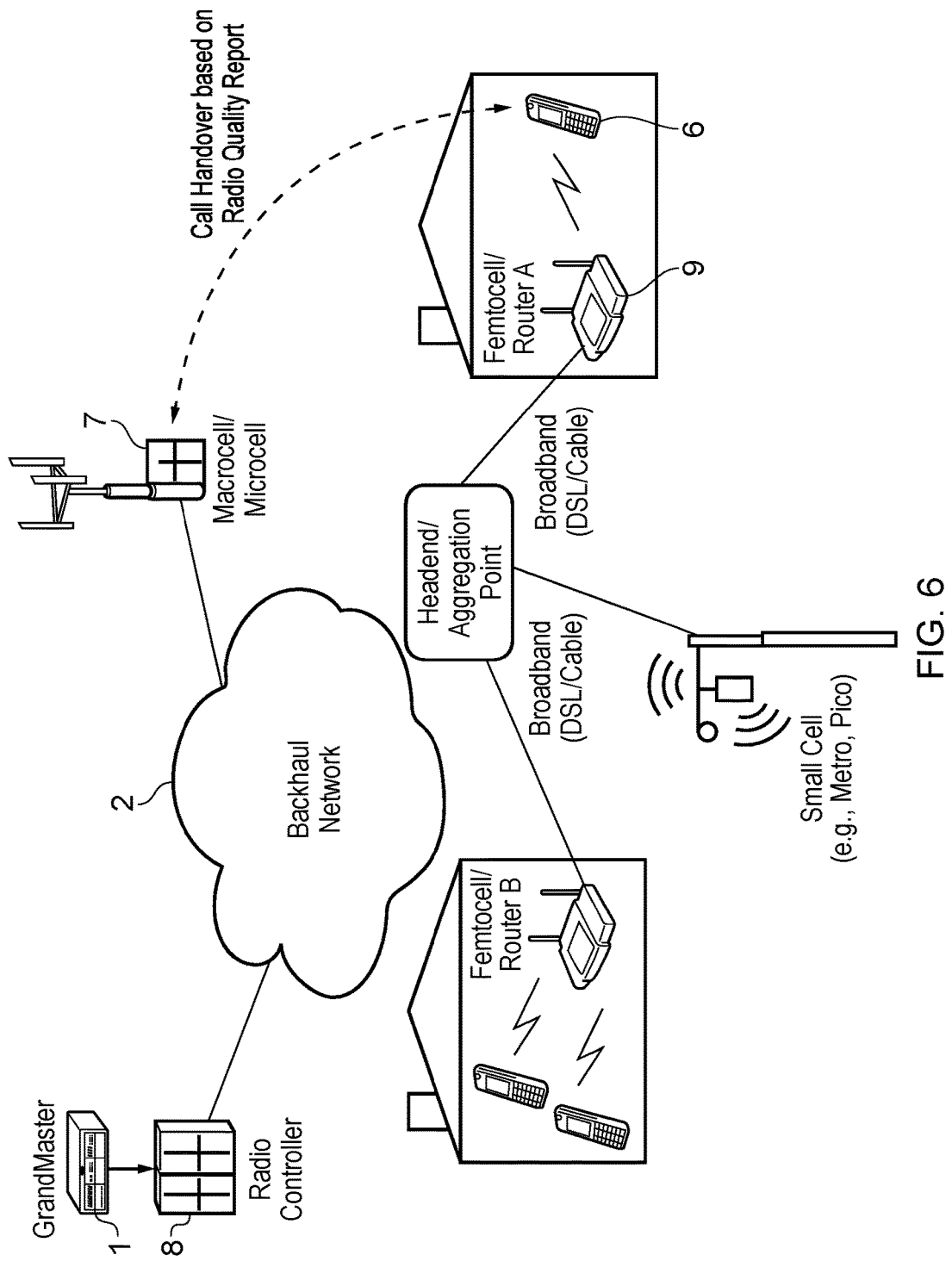
FIG. 6 shows the use of frequency synchronization accuracy as a quality metric for call handover.

Frequency Synchronization Accuracy as an Additional Quality Metric for Call Handover FIG. 6 illustrates how the frequency synchronization accuracy can be used as a quality metric for call handover in a method according to a further embodiment of the present invention.

The call handover process is of major importance within any mobile network. It is necessary to ensure it can be performed reliably and without disruption to any calls. Failure for it to perform reliably can result in dropped calls, and this is one of the key factors that can lead to customer dissatisfaction, which in turn may lead to them changing to another mobile network provider. Accordingly handover is one of the key performance indicators monitored so that a robust cellular handover regime is maintained on the mobile network.

The mobile network needs to decide when handover is necessary, and to which cell. Also when the handover occurs it is necessary to re-route the call to the relevant base station along with changing the communication between the mobile and the base station to a new channel. All of this needs to be undertaken without any noticeable interruption to the call. Different mobile networking standards/technologies handle handover in slightly different ways.

In handover between the radio access systems, handover preparation is done before changing systems, including tasks such as securing resources on the target radio access system, through cooperation between the radio access systems. Then, when the actual switch occurs, only the network path needs to be switched, reducing handover processing time. Also, loss of data packets that arrive at the pre-switch access point during handover can be avoided using a data forwarding function.

The mobile handset 6 sends a radio quality report containing the handover candidate base- stations and other information to the current base station 7. The base station 7 decides whether handover shall be performed based on the information in the report, identifies the base station and radio controller 8 to switch to, and begins handover preparation.

In the method of this embodiment, the frequency synchronization accuracy is used as an additional quality metric for call handover between base stations. It is assumed that this metric is noted by the radio access systems and/or carried as part of the quality report sent by the mobile handset 6 to the base station 7 during call handover.

There are a number of parameters that need to be known to determine whether a handover is required. These include the signal strength of the base station 7 with which communication is currently being made, along with the signal strengths of the surrounding stations. Additionally the availability of channels also needs to be known. The mobile handset 6 is obviously best suited to monitor the strength of the base stations, but only the mobile network knows the status of channel availability (including in this method the synchronization accuracy at the base stations) and the network makes the decision about when the handover is to take place and to which channel of which cell.

For example, consider a situation where some femtocells 9 in the mobile network are not very accurately synchronized. If the network at least knows that a particular cell is not well synchronized then that will enable the network to take some action at a system level. So for example if femtocell A is not accurately synchronized, the handover algorithm could prevent handover to femtocell A, such that the customer stays on the macrocell/microcell 7 with a relatively good service.

In the broader context, this leads to a handover process that operates as follows. The mobile handset 6 continually monitors the signal strengths of the base stations it can hear, including the one it is currently using, and it feeds this information back to the network. When the strength of the signal from the base station 7 that the mobile is using starts to fall to a level where action needs to be taken, the mobile network looks at the reported strength of the signals from other cells reported by the mobile. It then checks for channel availability, and if one is available it informs this new cell to reserve a channel for the incoming mobile. It also checks for the frequency synchronization accuracy of the other cells. When ready, the current base station passes the information for the new channel to the mobile, which then makes the change. Once there the mobile sends a message on the new channel to inform the network it has arrived. If this message is successfully sent and received then the network shuts down communication with the mobile on the old channel, freeing it up for other users, and all communication takes place on the new channel.

Under some circumstances such as when one base transceiver station is exceeding its synchronization accuracy limits, the network may decide to hand some mobiles over to another base transceiver station they are receiving that are better synchronized.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. *IEEE Standard for a Precision Clock Synchronization Protocol for Networked Measurement and Control Systems*, IEEE 1588-2008.
[2]. S. B. Moon, P. Skelly and D. Towsley, "Estimation and removal of clock skew from network delay measurements," in Proc. *IEEE INFOCOM*, vol. 1, pp. 227-234, New York, N.Y., USA, March 1999.
[3]. P. Skelly, S. B. Moon, D. Towsley, Verizon Laboratories Inc. (2003), Clock skew estimation and removal, U.S. Pat. No. 6,661,810.
[4]. L. Zhang, Z. Liu and C. H. Xia, "Clock synchronization algorithms for network measurements," in Proc. *IEEE INFOCOM*, vol. 1, pp. 160-169, November 2002.
[5]. Z. Liu, C. H. Xia, L. Zhang, International Business Machines Corporation (2005), Clock synchronization with removal of clock skews through network measurements in derivation of a convex hull, U.S. Pat. No. 6,957,357.
[6]. A. Bletsas, "Evaluation of Kalman filtering for network time keeping," *IEEE Transactions on Ultrasonics, Ferroelectrics and Frequency Control*, vol. 52, no. 9, pp. 1452-1460, September 2005.
[7]. James Aweya and Saleh Al-Araji, Method and System for Frequency Synchronization, WO 2013/020903A. (U.S. Pat. No. 8,913,632)

All references referred to above are hereby incorporated by reference.

The invention claimed is:

1. A method of estimating the skew of a first clock in a slave device relative to a second clock in a master device, the slave device and master device being communicatively connected by a network, the method including the steps of:
  receiving, at the slave device, timing messages sent from the master device having timestamps from the second clock;
  deriving in the slave device, using said timing messages, a corrected clock which is an adjusted version of the first clock and which is synchronized to the second clock;
  calculating the ratio between the evolution of the corrected clock and the evolution of the uncorrected clock over a discrete time period; and
  estimating the skew from the calculated ratio.

2. The method according to claim 1 wherein the skew is estimated as $$\alpha = \frac{\Delta R}{\Delta C} - 1$$

wherein $\alpha$ is the skew, $\Delta R_{[[n]]}$ is the evolution of the corrected clock between a first time and a second, subsequent time, and $\Delta C_{[[n]]}$ is the evolution of the first clock between said first time and said second time.

3. The method according to claim 1 wherein the corrected clock is derived using a digital phase-locked loop by:
  initializing a counter on arrival of the first of said timing messages in the slave device; and
  repeatedly:
  incrementing the counter with the output of a phase accumulator driven by an oscillator in the slave device;
  comparing the phase of the timestamps in the timing messages arriving at the slave device with the value of the counter to calculate an error signal;
  filtering the error signal to produce a control signal; and
  controlling the frequency of the phase accumulator using said control signal to synchronise the frequency of the output of the phase accumulator with the frequency of the second clock.

4. The method according to claim 1 wherein the first clock is a free-running counter driven by an oscillator in the slave device.

5. The slave device connected to a master device over a network, the slave device having a first clock and a processor, the processor being arranged to:
  receive timing messages sent from the master device, the messages having timestamps from a second clock in the master device;
  derive, using said timing messages, a corrected clock which is an adjusted version of the first clock and which is synchronized to the second clock;
  calculate the ratio between the evolution of the corrected clock and the evolution of the uncorrected clock over a discrete time period; and
  estimate the skew from the calculated ratio.

6. The device according to claim 5 wherein the processor estimates the skew as $$\alpha = \frac{\Delta R}{\Delta C} - 1$$

wherein $\alpha$ is the skew, $\Delta R_{[[n]]}$ is the evolution of the corrected clock between a first time and a second, subsequent time, and $\Delta C_{[[n]]}$ is the evolution of the first clock between said first time and said second time.

7. The device according to claim 5 further including a digital phase-locked loop which is arranged to derive said corrected clock, and an oscillator, the digital phase-locked loop having:
  a counter which is initialized on arrival of the first of said timing messages in the slave device;
  a phase accumulator driven by the oscillator, the output of which increments the counter;
  a phase detector which compares the phase of the timestamps in the timing messages arriving at the slave device with the value of the counter to calculate an error signal;
  a loop filter which filters the error signal to produce a control signal which controls the frequency of the phase accumulator to synchronise the frequency of the output of the phase accumulator with the frequency of the second clock.

8. The device according to claim 5 wherein the first clock is a free-running counter driven by an oscillator in the slave device.

9. A networked system, the system including a master device and a slave device connected over a network, wherein:
- the slave device has a first clock and a processor;
- the master device has a second clock; and
- the processor is arranged to:
    - receive timing messages sent from the master device, the messages having timestamps from a second clock in the master device;
    - derive, using said timing messages, a corrected clock which is an adjusted version of the first clock and which is synchronized to the second clock;
    - calculate the ratio between the evolution of the corrected clock and the evolution of the uncorrected clock over a discrete time period; and
    - estimate the skew from the calculated ratio.

10. The system according to claim 9 wherein the processor estimates the skew as $$\alpha = \frac{\Delta R}{\Delta C} - 1$$

wherein $\alpha$ is the skew, $\Delta R_{[[n]]}$ is the evolution of the corrected clock between a first time and a second subsequent time, and $\Delta C_{[[n]]}$ is the evolution of the first clock between said first time and said second time.

11. The system according to claim 9 wherein the slave device further includes a digital phase-locked loop which is arranged to derive said corrected clock, and an oscillator, the digital phase-locked loop having:
- a counter which is initialized on arrival of the first of said timing messages in the slave device;
- a phase accumulator driven by the oscillator, the output of which increments the counter;
- a phase detector which compares the phase of the timestamps in the timing messages arriving at the slave device with the value of the counter to calculate an error signal;
- a loop filter which filters the error signal to produce a control signal which controls the frequency of the phase accumulator to synchronise the frequency of the output of the phase accumulator with the frequency of the second clock.

12. The system according to claim 9 wherein the first clock is a free-running counter driven by an oscillator in the slave device.

* * * * *